(12) United States Patent
Owen et al.

(10) Patent No.: US 6,246,764 B1
(45) Date of Patent: Jun. 12, 2001

(54) PORTABLE TELEPHONE SHOULDER REST

(76) Inventors: Michael P. Owen; Julie A. Owen, both of 2328 Vine St., West Des Moines, IA (US) 50265; Margaret A. Owen, 3406 SW. 31st St., Des Moines, IA (US) 50321

( * ) Notice: Subject to any disclaimer, the term of this patent is extended or adjusted under 35 U.S.C. 154(b) by 0 days.

(21) Appl. No.: 09/670,433

(22) Filed: Sep. 26, 2000

(51) Int. Cl.$^7$ .................................................. H04M 1/00
(52) U.S. Cl. ............................................................ 379/449
(58) Field of Search ................................... 379/449, 454, 379/455, 446, 426, 447

(56) References Cited

U.S. PATENT DOCUMENTS

| | | |
|---|---|---|
| D. 273,677 | 5/1984 | Martinsen . |
| D. 276,229 | 11/1984 | Heilner . |
| D. 278,057 | 3/1985 | McMaster . |
| D. 287,496 | 12/1986 | Bricker . |
| D. 290,956 | 7/1987 | Witham . |
| D. 294,025 | 2/1988 | Boykiw . |
| D. 308,062 | 5/1990 | Leoni et al. . |
| D. 315,353 | 3/1991 | Greenwood, Sr. et al. . |
| D. 323,828 | 2/1992 | Martinsen et al. . |
| D. 323,829 | 2/1992 | Martinsen et al. . |
| D. 326,856 | 6/1992 | Hare et al. . |
| D. 350,356 | 9/1994 | Wood . |
| D. 413,608 | 9/1999 | Bryant et al. . |
| 4,058,689 | 11/1977 | Stebinger . |
| 4,238,647 | 12/1980 | Maspoli . |
| 4,320,262 | 3/1982 | Read . |
| 4,736,417 | 4/1988 | Van Dyke . |
| 4,759,058 | 7/1988 | Sutton . |
| 4,878,237 | 10/1989 | Cianflone . |
| 4,961,223 | 10/1990 | Sutton . |
| 5,008,932 | 4/1991 | Sieggen . |
| 5,115,465 | 5/1992 | Freer . |
| 5,503,313 | 4/1996 | Wei . |
| 5,668,869 | 9/1997 | Zinno . |
| 5,703,945 | 12/1997 | Smith . |

FOREIGN PATENT DOCUMENTS

WO 8202305 * 7/1982 (WO) ..................................... 379/449

* cited by examiner

*Primary Examiner*—Jack Chiang
(74) *Attorney, Agent, or Firm*—Henderson & Sturm LLP

(57) ABSTRACT

A portable telephone shoulder rest comprising a base member formed of a flexible pouch filled with a weighted material, and a sleeve attached to the upper side of the flexible pouch. The sleeve is formed of elastic side panels interconnected by a flexible transparent perforated top panel. The lower portion of a portable telephone handset is received in the top end of the sleeve and extends through the open bottom end of the sleeve where the end of the handset rests in a depression formed in the flexible pouch. When inserted into the sleeve, the keypad of the handset underlies the flexible transparent top panel so that it may be viewed and actuated through the top panel. A non-slip surface may be applied to the upper side of the pouch to assist in securely retaining the handset within the sleeve. Also, a non-slip surface may be applied to the bottom surface of the pouch so that it securely rests on the shoulder of the user.

20 Claims, 2 Drawing Sheets

PORTABLE TELEPHONE SHOULDER REST

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of telephone accessories, and more particularly to a shoulder rest for a cellular or cordless telephone handset.

2. Description of Related Art

As can be seen by reference to the following U.S. Pat. Nos. D273,677; D276,229; D278,057; D287,496; D290,956; D294,025; D308,062; D315,353; D323,828; D323,829; D326,856; D350,356; D413,608; 4,058,689; 4,238,647; 4,320,262; 4,736,417; 4,759,058; 4,878,237; 4,961,223; 5,008,932; 5,115,465; 5,503,313; 5,668,869 and 5,703,945, the prior art is replete with myriad and diverse telephone shoulder rests.

While all of the aforementioned prior art constructions are more than adequate for the basic purpose and function for which they have been specifically designed, they are uniformly deficient with respect to their failure to provide a simple, efficient, and practical portable telephone shoulder rest suitable for hands-free use of telephone handsets having various casing shapes and designs.

As a consequence of the foregoing situation, there has existed a longstanding need for a new and improved portable telephone shoulder rest and the provision of such a construction is a stated objective of the present invention.

BRIEF SUMMARY OF THE INVENTION

Briefly stated, the present invention provides a portable telephone shoulder rest comprising a base member formed of a flexible pouch filled with a weighted material, and a sleeve attached to the upper side of the flexible pouch. The sleeve is formed of elastic side panels interconnected by a flexible transparent perforated top panel. The lower portion of a portable telephone handset is received in the top end of the sleeve and extends through the open bottom end of the sleeve where the end of the handset rests in a depression formed in the flexible pouch. When inserted into the sleeve, the keypad of the handset underlies the flexible transparent top panel so that it may be viewed and actuated through the top panel. A non-slip surface may be applied to the upper side of the pouch to assist in securely retaining the handset within the sleeve. Also, a non-slip surface may be applied to the bottom surface of the pouch so that it securely rests on the shoulder of the user.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
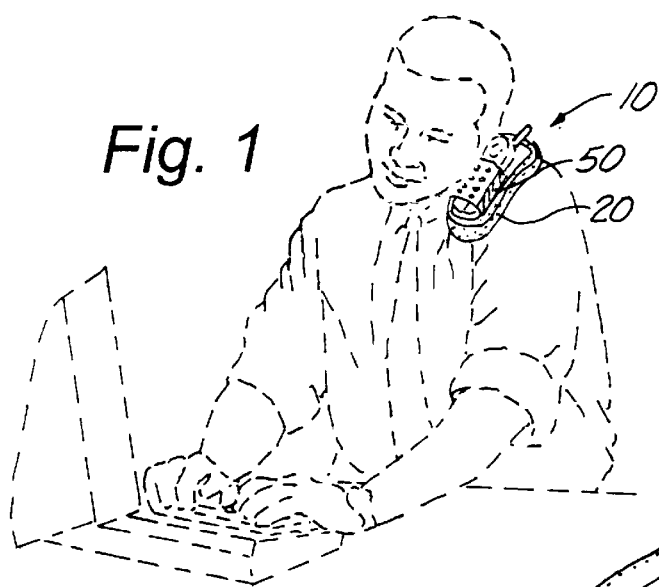
FIG. 1 is a perspective view of the portable telephone shoulder rest of the present invention positioned on the shoulder of a user.
Figure 2:
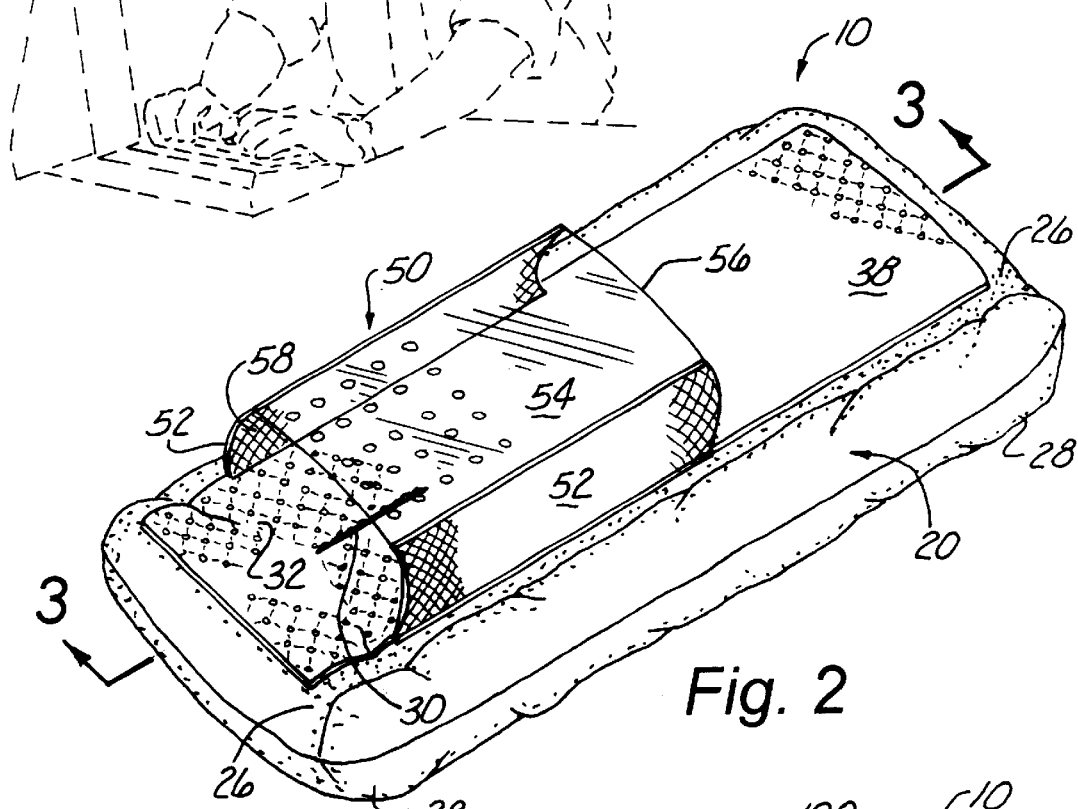
FIG. 2 is a perspective view of the upper side of the shoulder rest.
Figure 3:
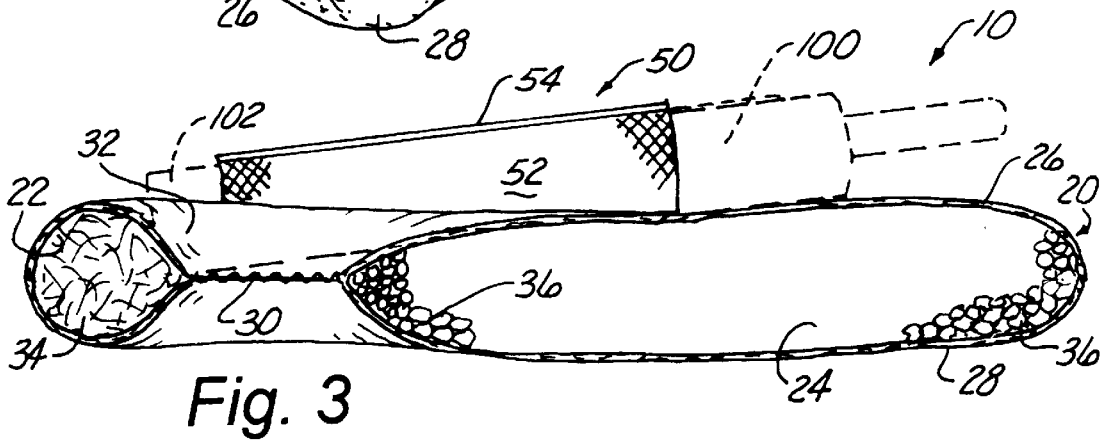
FIG. 3 is a side elevation sectional view taken along line 3—3 of FIG. 2.
Figure 4:
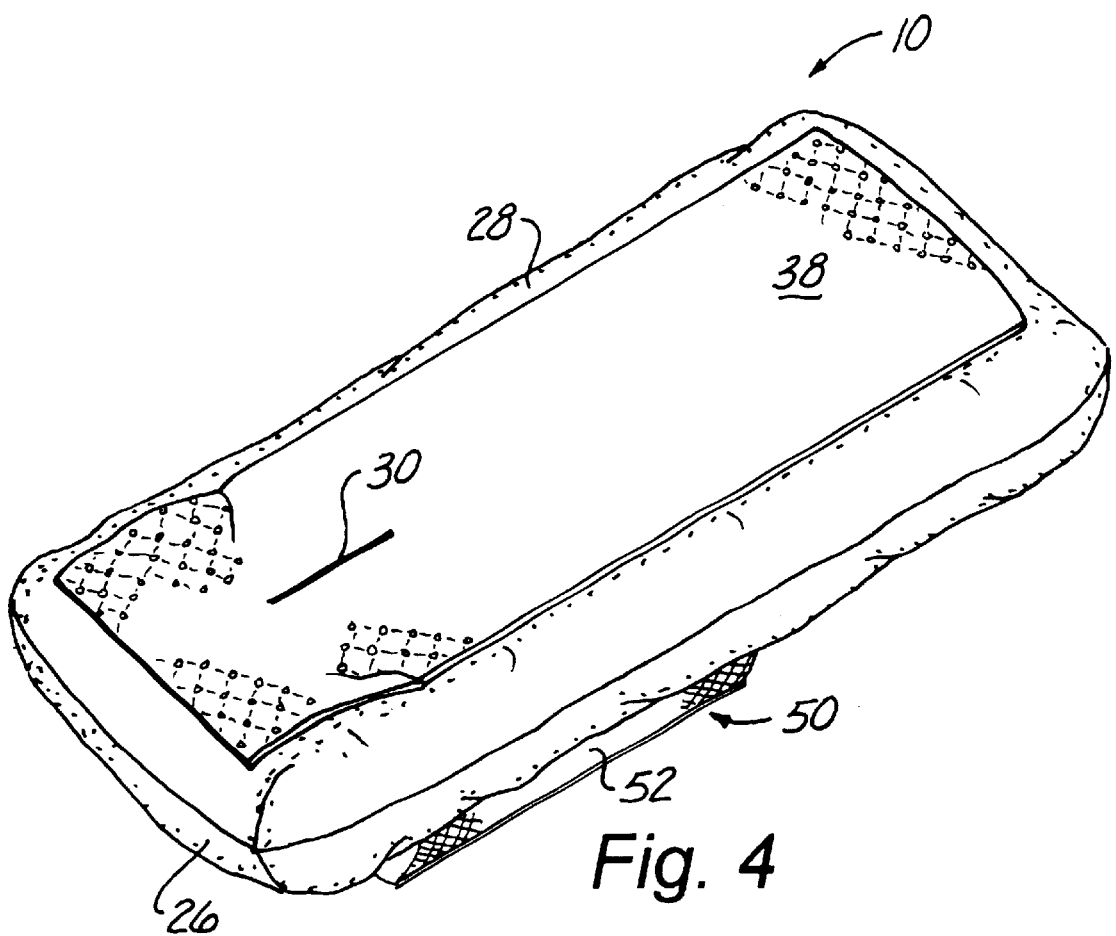
FIG. 4 is a perspective view of the lower side of the shoulder rest.
Figure 5:
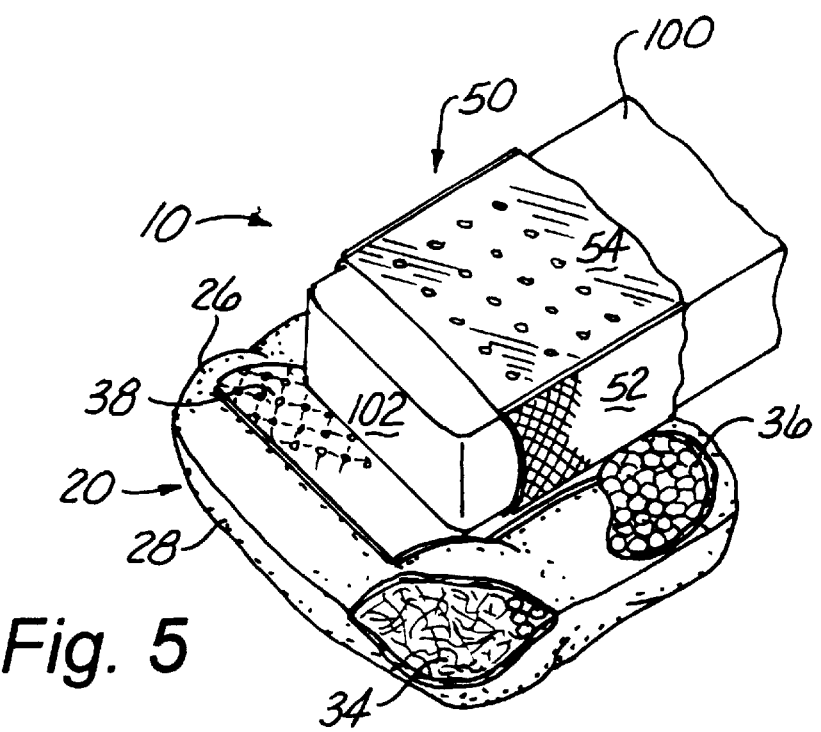
FIG. 5 is a partial perspective view with portions cutaway to show the soft fiber material in the lower compartment of the pouch and the weighted pelletized material in the upper compartment of the pouch.

As can be seen by reference to the drawings, and in particularly to FIG. 1, the portable telephone shoulder rest that forms the basis of the present invention is designated generally by the reference number 10. The shoulder rest 10 includes a base member formed of a flexible pouch 20 having an interior cavity divided into a lower compartment 22 and an upper compartment 24. The lower and upper compartments 22, 24 are formed by attachment of a portion of the upper side 26 of the pouch 20 to a portion of the lower side 28 by stitching 30 along the longitudinal axis of the pouch 10 as best shown in FIGS. 2 and 3. The stitching 30 also creates a depression 32 in the upper side 26 of the pouch 20.

A soft fiber material 34 fills the lower compartment 22 and a weighted pelletized material 36 fills the upper compartment 24. The soft fiber material may be any suitable soft material such as the 100% polyester fiber made by Fairfield Processing Corp. Of Danbury, Conn. and sold under the name Sew Perfect®. Likewise, the weighted pelletized material 36 can be selected from various suitable alternatives such as the 100% polypropylene pellets sold under the name Sew Perfect®, Poly-Pellets® by Fairfield Processing Corp.

The upper side 26 and the lower side 28 of the pouch 20 both carry a non-slip surface 38. The non-slip surface 38 may, for example, be a rubberized mesh material similar to that used as carpet backing or any other suitable material. It is also to be understood that the pouch 20 may be formed of any available flexible material including fabrics, plastics or leather.

A sleeve 50 is attached to the upper side 26 of the pouch 20 and includes a pair of elastic side panels 52 interconnected by a flexible transparent perforated top panel 54. The sleeve 50 has an open top end 56 and an open bottom end 58. The sleeve 50 may be sized and shaped to accommodate any of a number of specific models of portable telephone handsets 100.

In use, the lower portion of the portable handset 100 is received into the open top end 56 of the sleeve 50 and extends through the open bottom 58 where the end 102 of the handset 100 rests in the depression 32 in the top side 26 of the pouch 20. The handset 100 is secured in position within the sleeve 50 by the end 102 resting in the depression 32, the frictional resistance provided by the elastic side panels 52, and the frictional resistance of the non-slip surface 38. When inserted into the sleeve 50, the keypad of the handset 100 may be conveniently viewed and actuated through the flexible transparent top panel 54.

The pouch 20 may be securely positioned on the shoulder of the user where the non-slip surface 38 on the lower side 28 of the pouch 20 minimizes the possibility of inadvertant movement. Also, the flexible pouch 20 allows the handset 100 to be comfortably positioned at various locations and angles on either the right or left shoulder of the user. Further, when the shoulder rest 10 is not in use it may be safely placed on a surface such as an automobile dashboard or console without sliding about.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A portable telephone shoulder rest, comprising:
   a base member including a flexible pouch having an interior cavity, an upper side, a lower side, and a weighted material disposed within the interior cavity of the flexible pouch; and
   a sleeve attached to the upper side of the flexible pouch and having a top end and a bottom end, the top end of the sleeve being disposed to selectively receive a portion of a portable telephone handset.

2. The portable telephone shoulder rest of claim 1 wherein the sleeve includes a pair of spaced elastic side panels and a top panel disposed to interconnect the side panels, each side panel having a lower edge attached to the upper side of the flexible pouch, and a top edge attached to the top panel that interconnects the side panels.

3. The portable telephone shoulder rest of claim 2 wherein the top panel is formed of a flexible transparent material.

4. The portable telephone shoulder rest of claim 2 wherein the top panel is perforated.

5. The portable telephone shoulder rest of claim 3 wherein the top panel is perforated.

6. The portable telephone shoulder rest of claim 1 wherein the sleeve includes an open top and an open bottom.

7. The portable telephone shoulder rest of claim 1 wherein the upper side of the flexible pouch carries a non-slip surface.

8. The portable telephone shoulder rest of claim 1 wherein the lower side of the flexible pouch carries a non-slip surface.

9. The portable telephone shoulder rest of claim 7 wherein the lower side of the flexible pouch carries a non-slip surface.

10. The portable telephone shoulder rest of claim 1 wherein the interior cavity of the flexible pouch includes a lower compartment and an upper compartment, the lower and upper compartments being formed by attachment of a portion of the upper side of the flexible pouch to a portion of the lower side of the flexible pouch.

11. The portable telephone shoulder rest of claim 10 wherein the attachment is by stitching along a portion of a longitudinal axis of the flexible pouch.

12. The portable telephone shoulder rest of claim 10 wherein the attachment forms a depression in the upper side of the flexible pouch.

13. The portable telephone shoulder rest of claim 11 wherein the attachment forms a depression in the upper side of the flexible pouch.

14. The portable telephone shoulder rest of claim 12 wherein the depression is located near the bottom end of the sleeve.

15. The portable telephone shoulder rest of claim 13 wherein the depression is located near the bottom end of the sleeve.

16. The portable telephone shoulder rest of claim 11 wherein the lower compartment is filled with a soft fiber material and the upper compartment is filled with weighted pelletized material.

17. The portable telephone shoulder rest of claim 13 wherein the lower compartment is filled with a soft fiber material and the upper compartment is filled with weighted pelletized material.

18. The portable telephone shoulder rest of claim 15 wherein the lower compartment is filled with a soft fiber material and the upper compartment is filled with weighted pelletized material.

19. The portable telephone shoulder rest of claim 6 wherein the interior cavity of the flexible pouch includes a lower compartment and an upper compartment, the lower and upper compartments being formed by attachment of a portion of the upper side of the flexible pouch to a portion of the lower side of the flexible pouch, and wherein the attachment forms a depression in the upper side of the flexible pouch.

20. The portable telephone shoulder rest of claim 19 wherein the depression is located near the bottom end of the sleeve.

* * * * *